US010124309B2

(12) United States Patent
Struillou et al.

(10) Patent No.: US 10,124,309 B2
(45) Date of Patent: Nov. 13, 2018

(54) PROCESS FOR PREPARING AMINOPLAST MICROCAPSULES

(71) Applicant: Firmenich SA, Geneva (CH)

(72) Inventors: Arnaud Struillou, Geneva (CH); Nicolas Pichon, Villaz (FR); Claudie Bellouard, Geneva (CH)

(73) Assignee: Firmenich SA, Geneva (CH)

( * ) Notice: Subject to any disclaimer, the term of this patent is extended or adjusted under 35 U.S.C. 154(b) by 130 days.

(21) Appl. No.: 15/114,511

(22) PCT Filed: Jan. 23, 2015

(86) PCT No.: PCT/EP2015/051329
§ 371 (c)(1),
(2) Date: Jul. 27, 2016

(87) PCT Pub. No.: WO2015/110568
PCT Pub. Date: Jul. 30, 2015

(65) Prior Publication Data
US 2016/0346752 A1    Dec. 1, 2016

(30) Foreign Application Priority Data
Jan. 27, 2014  (EP) .................................. 14152610

(51) Int. Cl.
| B01J 13/16 | (2006.01) |
| C11D 3/37 | (2006.01) |
| C11D 3/50 | (2006.01) |
| C11D 17/00 | (2006.01) |
(Continued)

(52) U.S. Cl.
CPC ............... *B01J 13/16* (2013.01); *B01J 13/14* (2013.01); *C11B 9/0015* (2013.01); *C11B 9/0019* (2013.01); *C11B 9/0034* (2013.01); *C11B 9/0061* (2013.01); *C11B 9/0076* (2013.01); *C11D 3/3723* (2013.01);
(Continued)

(58) Field of Classification Search
CPC .................................. B01J 13/14; B01J 13/16
See application file for complete search history.

(56) References Cited

U.S. PATENT DOCUMENTS

| 3,169,930 A | 2/1965 | Gedge |
| 4,353,809 A | 10/1982 | Hoshi et al. |
| 4,929,380 A | 5/1990 | Schulz et al. |
(Continued)

FOREIGN PATENT DOCUMENTS

| EP | 1741775 A1 | 1/2007 |
| EP | 1767185 B1 | 10/2010 |
(Continued)

OTHER PUBLICATIONS

International Search Report and Written Opinion, application PCT/EP2015/051329, dated Mar. 31, 2015.
(Continued)

*Primary Examiner* — Arrie L Reuther
(74) *Attorney, Agent, or Firm* — Winston & Strawn LLP

(57) ABSTRACT

The present invention relates to a one-shell aminoplast core-shell microcapsule crosslinked with a polyisocyanate and encapsulating a perfume oil, prepared with very low amount of aminoplast resin. It also provides use of said aminoplast microcapsules in liquid aqueous and powder surfactant-rich consumer products.

18 Claims, 3 Drawing Sheets

(51) Int. Cl.
     *B01J 13/14*     (2006.01)
     *C11B 9/00*      (2006.01)
(52) U.S. Cl.
     CPC ............ *C11D 3/3769* (2013.01); *C11D 3/505*
                      (2013.01); *C11D 17/0039* (2013.01)

(56)                References Cited

U.S. PATENT DOCUMENTS

| 2005/0112152 | A1 | 5/2005 | Popplewell et al. |
| 2005/0153135 | A1 | 7/2005 | Popplewell et al. |
| 2006/0248665 | A1 | 11/2006 | Pluyter et al. |
| 2007/0202063 | A1 | 8/2007 | Dihora et al. |
| 2014/0378367 | A1* | 12/2014 | Pichon ............... C11D 3/505 510/337 |

FOREIGN PATENT DOCUMENTS

| GB | 1455283 A | 11/1976 |
| GB | 2432843 A | 6/2007 |
| GB | 2432850 A | 6/2007 |
| GB | 2432851 A | 6/2007 |
| GB | 2432852 A | 6/2007 |
| WO | WO2004016234 A1 | 2/2004 |
| WO | WO2007062733 A1 | 6/2007 |
| WO | WO2007062833 A1 | 6/2007 |
| WO | WO2008016684 A1 | 2/2008 |
| WO | WO2008098387 A1 | 8/2008 |
| WO | WO2011161618 A1 | 12/2008 |
| WO | WO2013092375 A1 | 6/2013 |
| WO | WO2005054422 A1 | 6/2015 |

OTHER PUBLICATIONS

Bonatz et al., Acta Polymerica 40 (1989) p. 683-690.
Dietrich et al., Acta Polymerica, vol. 40 (1989) pp. 243-251.
Dietrich et al., Acta Polymerica 40 (1989) pp. 325-331.
Dietrich et al. Acta Polymerica, 1990, vol. 41, 91-95.
Lee et al., J. of Microencapsulation, 2002, vol. 19, pp. 559-569.

* cited by examiner

PROCESS FOR PREPARING AMINOPLAST MICROCAPSULES

This application is a 371 filing of International Patent Application PCT/EP2015/051329 filed 23 Jan. 2015, which claims the benefit of European patent application no 14152610.3 filed 27 Jan. 2014.

TECHNICAL FIELD

The present invention relates to core-shell aminoplast microcapsules cross-linked with a polyisocyanate and encapsulating an oil, in particular a perfume oil. These capsules contain very low amounts of aminoplast resin while having a high perfume payload in the core of the capsule. They present improved properties, in particular reduced perfume leakage in challenging media. The use of said aminoplast microcapsules in particular in liquid aqueous surfactant-rich consumer products as a perfume delivery system with the effect of reducing the amount of free formaldehyde being released into the consumer product upon storage while improving its olfactive performance, as well as liquid aqueous surfactant-rich consumer products comprising said capsules are also objects of the invention.

BACKGROUND OF THE INVENTION

One of the problems faced by the perfumery industry lies in the relatively rapid loss of the olfactive benefit provided by odoriferous compounds due to their volatility, particularly that of "top-notes". This problem is generally tackled using a delivery system, e.g. capsules containing a perfume, to release the fragrance in a controlled manner Aminoplast microcapsules formed of a melamine-formaldehyde resin are frequently used to encapsulate hydrophobic actives, thus protecting said actives and providing their controlled release.

However, capsules such as aminoplast ones suffer from stability problems when used in consumer products comprising surfactants, such as perfumery consumer products, especially after prolonged storage at elevated temperatures. In such products, the encapsulated active tends to leak out of the capsule, even though the capsule wall remains intact, by diffusion through the wall due to the presence of surfactants that are able to solubilise the encapsulated active in the product base. The leakage phenomenon reduces the efficiency of the capsules in protecting the active and providing its controlled release. This is especially disadvantageous when the active is a volatile ingredient such as a perfume.

Diverse technologies have been developed to improve the stability of aminoplast capsules, i.e. reducing perfume leakage in perfumery consumer products. In EP1767185, the composition of the encapsulated material is specifically designed to avoid leakage. Another approach described in the prior art for example in US2005/0112152 and US2005/0153135, consists in further diluting the perfume oil into an equal amount of very hydrophobic solvent with a log P>5.5 to reduce perfume leakage. However, this drastically reduces the pure perfume oil payload in the capsule. US2006/0248665 also addresses the reduction of perfume leakage rate by catalysing the curing cross-linking reactions in the wall by acid, metal salt or high temperature catalysis.

Alternatively, some prior art documents such as WO2004/016234 disclose coating of the capsules with an additional layer or shell (two shells systems).

Whatever solutions have been proposed to address the problem of perfume leakage, all these prior arts have in common the fact that the ratio between the quantity of aminoplast resin (melamine-formaldehyde) used to make the capsule wall to the quantity of encapsulated perfume oil in the hydrophobic core of the capsule is relatively high, as it is well known heretofore to those skilled in the art that the more melamine-formaldehyde resin is used to make the capsule walls, the better the storage stability of the capsules and therefore the lower the perfume leakage in aqueous surfactant-rich consumer products like fabric-softener, liquid detergents, shampoo, hair conditioners or yet shower gels. The ratio of pure melamine-formaldehyde resin used to make the wall to the perfume oil payload of the capsules typically varies between 0.12 and 0.20 as exemplified in the various patent applications mentioned above.

However, while the use of a large amount of aminoplast resin has always been described as helping stabilization of the capsule and reducing perfume leakage (by making the wall thicker), it also has a negative effect on olfactive performance of the capsule, making it more difficult to break to release its perfume payload thus reducing the end-consumer benefit.

More recently, it has been described in WO2008/098387A1 that the use of aromatic polyols like resorcinol in the water phase to cross-link the melamine-formaldehyde wall would stabilize it and reduce perfume leakage upon storage. However that prior art still teaches that the lower the ratio of melamine-formaldehyde resin used to the perfume oil, the higher the perfume leakage upon storage in fabric-softener. In particular, even for the more stable capsules described with resorcinol, reducing the ratio from 0.15 to 0.09 leads to close to doubling perfume leakage upon storage, thus limiting the expectation of a benefit when further reducing the ratio of melamine-formaldehyde resin to the perfume oil. WO2013/092375 A1 from the applicant describes another way to achieve some of these goals by stabilizing the aminoplast microcapsules with a polyisocyanate cross-linker pre-dissolved in small quantity in the perfume oil core prior to encapsulation.

Despite those teachings, there is still a need to improve aminoplast-based perfume delivery systems. In particular it would be advantageous to find a capsule encapsulating a perfume oil which would combine good storage stability of the capsules with a reduced perfume leakage in aqueous surfactant-rich consumer products together with improved olfactive performance/ease of breaking during gentle handling and when rubbing. This olfactive performance translates in the perfume intensity perceived e.g. on dry fabrics.

SUMMARY OF THE INVENTION

The present invention brings a solution to the above-mentioned problems and provides further advantages through a capsule made with very low amounts of aminoplast resin to make its wall thinner and high perfume payloads, while providing a right balance between stability and olfactive performance. A first object of the invention consists of a one shell aminoplast core-shell microcapsule obtainable by a process comprising the steps of:
1) admixing a perfume oil with at least one polyisocyanate having at least two isocyanate functional groups to form an oil phase;
2) dispersing or dissolving into water an aminoplast resin and optionally a stabilizer to form a water phase;
3) adding the oil phase to the water phase to form an oil-in-water dispersion, wherein the mean droplet size is comprised between 1 and 100 μm;

4) performing a curing step to form at least one microcapsule in the form of a liquid dispersion; and
5) optionally drying the liquid dispersion to obtain at least one dried core-shell microcapsule;
wherein the aminoplast resin is added in an amount such that the w/w ratio between the aminoplast resin and the perfume oil in the dispersion is comprised between 0.001 and 0.09.

A perfuming composition containing
   (i) Microcapsules as defined above;
   (ii) At least one ingredient selected from the group consisting of a perfumery carrier and a perfumery co-ingredient and mixtures thereof; and
   (iii) Optionally at least one perfumery adjuvant,
is a second object of the invention.

In a third aspect, the invention relates to a liquid perfumed consumer product comprising:
a) from 2 to 65% by weight, relative to the total weight of the consumer product, of at least one surfactant;
b) water and/or water-miscible solvents; and
c) microcapsules defined above.

In a fourth aspect, the invention relates to a powder perfumed consumer product comprising:
a) from 2 to 65% by weight, relative to the total weight of the consumer product, of at least one surfactant; and
b) microcapsules defined above.

The use of capsules as defined above in surfactant-rich consumer products as a perfume delivery system is also part of the invention.

DETAILED DESCRIPTION OF THE INVENTION

Figure 1:
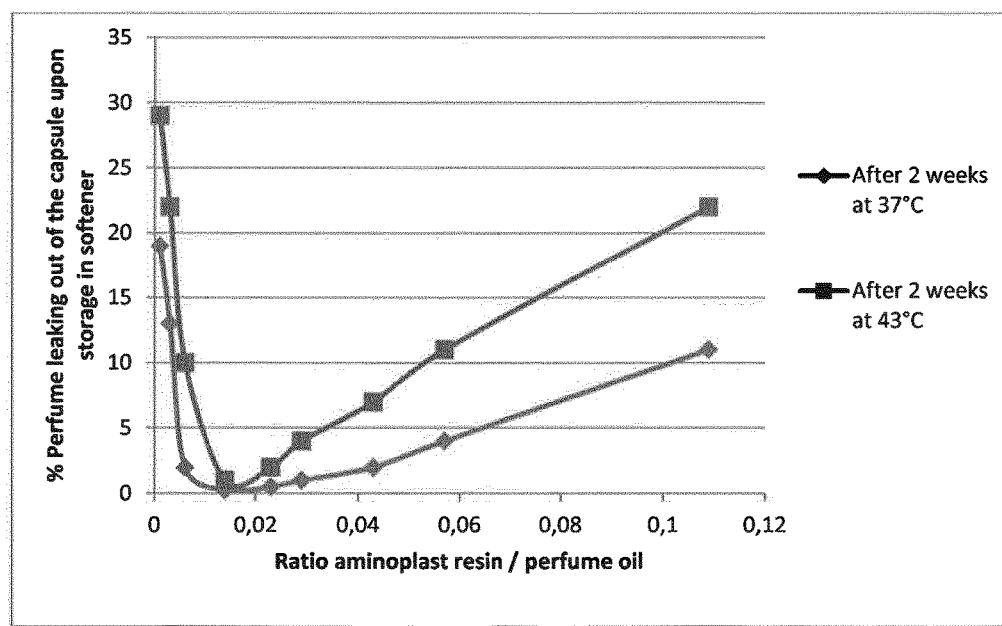
FIG. 1 represents the percentage of perfume leaking out of capsules into a softener base after 2 weeks storage of the softeners at either 37° C. or 43° C., as a function of the ratio of aminoplast resin to perfume oil.

Unless otherwise specified, % are meant to designate percentage by weight of a composition.

It has now been found that unexpectedly, while keeping the amount of polyisocyanate constant as described in WO2013/092375A1, the amount of aminoplast resin needed to make the wall of an aminoplast microcapsule encapsulating a perfume oil could be dramatically reduced while not only maintaining storage stability of the capsule but in fact significantly improving it and at the same time significantly improving the olfactive performance i.e. ease of breaking of the capsules as shown by higher perfume intensity on dry fabrics during very gentle handling and after rubbing. Another unexpected benefit of the invention is that when reducing the amount of aminoplast resin used to make the wall, the amount of free formaldehyde being released from the wall into the consumer good product is reduced by a much greater factor than the reduction factor in aminoplast resin in the wall.

A first object of the invention is therefore a one shell aminoplast core-shell microcapsule obtainable by a process comprising the steps of:
1) admixing a perfume oil with at least one polyisocyanate having at least two isocyanate functional groups to form an oil phase;
2) dispersing or dissolving into water an aminoplast resin and optionally a stabilizer to form a water phase;
3) adding the oil phase to the water phase to form an oil-in-water dispersion, wherein the mean droplet size is comprised between 1 and 100 µm;
4) performing a curing step to form at least one microcapsule in the form of a liquid dispersion; and
5) optionally drying the final dispersion to obtain at least one dried core-shell microcapsule;
wherein the aminoplast resin is added in an amount such that the w/w ratio between the aminoplast resin and the perfume oil in the dispersion is comprised between 0.001 and 0.09.

Now, contrary to all teachings in this technical area heretofore it has been unexpectedly found that the use of even very small amounts of aminoplast resin combined with polyisocyanate is clearly beneficial to achieve good stability and improved olfactive performance of the delivery system. It has in particular been found that when the aminoplast resin is added in an amount such that the w/w ratio between the aminoplast resin and the perfume oil in the dispersion is comprised between 0.001 and 0.09, preferably between 0.003 and 0.06, most preferably between 0.005 and 0.04, most preferably between 0.005 and 0.009, capsules with improved properties could be obtained.

For the sake of clarity, by the wording "one-shell" or "one-wall" it is meant here that said microcapsules do have a wall which is not coated, nor internally or externally, by a different material or a film-forming polymer. In any case the invention capsules are devoid of polysiloxane and/or PVP (polyvinyl pyrrolidone) and its co-copolymers. Said microcapsules may have material deposited on their surface, such as colloidal stabilisers or a cationic polymer, but in amount in any case insufficient to form a continuous phase, film, wall, coating made of another polymer or resin.

For the sake of clarity, by the expression "core-shell microcapsule", or the similar, in the present invention it is meant that the capsule has a size in the micron range (e.g. a mean diameter comprised between about 1 and 100 µm) and comprises an external solid oligomers-based shell or wall and an internal continuous oil phase enclosed by the external shell. In other words bodies like coacervates or extrudates (i.e. porous solid phases containing droplets of a liquid) are not part of the invention. According to an embodiment of the invention, the size of said microcapsules corresponding to the droplet size in step 3), is comprised between about 5 and 50 µm, or even between about 5 and 25 µm.

For the sake of clarity, by the expression "dispersion", in the present invention it is meant a system in which particles are dispersed in a continuous phase of a different composition and specifically includes a suspension or an emulsion.

By "perfume oil" also referred to as "perfume" we mean here an ingredient or a composition that is a liquid at about 20° C. According to any one of the above embodiments said perfume oil in which at least one polyisocyanate is dissolved in step 1) can be a perfuming ingredient alone or a mixture of ingredients. As a "perfuming ingredient" it is meant here a compound, which is used in perfuming preparations or compositions to impart a hedonic effect. In other words such an ingredient, to be considered as being a perfuming one, must be recognized by a person skilled in the art as being able to impart or modify in a positive or pleasant way the odor of a composition, and not just as having an odor. For the purpose of the present invention, malodor counteracting ingredients are also encompassed by the definition of "perfuming ingredient".

The nature and type of the perfuming ingredient(s) present in the perfume oil do not warrant a more detailed description here, which in any case would not be exhaustive, the skilled person being able to select them on the basis of its general knowledge and according to the intended use or application and the desired organoleptic effect. In general terms, these perfuming ingredients belong to chemical classes as varied as alcohols, aldehydes, ketones, esters, ethers, acetates, nitriles, terpenoids, nitrogenous or sulphurous heterocyclic compounds and essential oils, and said perfuming ingredients can be of natural or synthetic origin. Many of these ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said ingredients may also be compounds known to release in a controlled manner various types of perfuming compounds.

The perfuming ingredient(s) to be encapsulated may be dissolved in a solvent of current use in the perfume industry. Thus the core of the capsule might be pure perfuming ingredients or a mixture of perfuming ingredients in an adequate hydrophobic solvent. The solvent is preferably not an alcohol. Examples of such solvents are diethyl phthalate, isopropyl myristate, Abalyn® (rosin resins, available from Eastman), benzyl benzoate, ethyl citrate and isoparaffins. Preferably, the perfume oil comprises less than 20% and more preferably less than 10% of solvent, all these percentages being defined by weight relative to the total weight of the perfume. Most preferably, the perfume is essentially free of solvent.

According to a particular embodiment of the invention, the perfume contains less than 10% of its own weight of primary alcohols, less than 15% of its own weight of secondary alcohols and less than 20% of its own weight of tertiary alcohols. Preferably, the perfume does not contain any primary alcohols and contains less than 15% of secondary and tertiary alcohols. Such limited amounts of alcohols have the advantage of reducing the amount of isocyanate functional groups reacting with the perfume.

According to any one of the invention's embodiments, the perfume oil represents between about 10% and 60% w/w, or even between 20% and 45% w/w, by weight, relative to the total weight of the dispersion obtained after step 3).

According to a particular embodiment, the oil phase consists essentially of the perfume oil and the at least one polyisocyanate.

The oil phase formed in step 1) comprises at least one polyisocyanate having at least two isocyanate functional groups.

Said polyisocyanate may comprise up to 6, or even only 4 isocyanate functional groups. According to any of the above embodiments, said polyisocyanate contains at least three isocyanate functional groups. Depending on the numbers of functional groups, optimal reaction of the polyisocyanate with the aminoplast resin is achieved, a higher number of isocyanate group per polyisocyanate compound leading to increased cross-linking.

Low volatility polyisocyanates are preferred because of their low toxicity.

The at least one polyisocyanate may be aliphatic, aromatic or a mixture of both aromatic and aliphatic polyisocyanates. In the case of mixtures of polyisocyanates, each member of the mixture has at least two isocyanate functional groups.

According to one embodiment, the at least one polyisocyanate is an aromatic polyisocyanate.

The term "aromatic polyisocyanate" is meant here as encompassing any polyisocyanate comprising an aromatic moiety. Preferably, it comprises a phenyl, a toluyl, a xylyl, a naphthyl or a diphenyl moiety, more preferably a toluyl or a xylyl moiety. Preferred aromatic polyisocyanates are biurets and polyisocyanurates, more preferably comprising one of the above-cited specific aromatic moieties. More preferably, the aromatic polyisocyanate is a polyisocyanurate of toluene diisocyanate (commercially available from Bayer under the tradename Desmodur® RC), a trimethylol propane-adduct of toluene diisocyanate (commercially available from Bayer under the tradename Desmodur® L75), a trimethylol propane-adduct of xylylene diisocyanate (commercially available from Mitsui Chemicals under the tradename Takenate® D-110N). In a most preferred embodiment, the aromatic polyisocyanate is a trimethylol propane-adduct of xylylene diisocyanate.

According to another embodiment, said polyisocyanate is an aliphatic polyisocyanate.

The term "aliphatic polyisocyanate" is defined as a polyisocyanate which does not comprise any aromatic moiety. Preferred aliphatic polyisocyanates are a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100), among which a biuret of hexamethylene diisocyanate is even more preferred.

According to another embodiment, said at least one polyisocyanate is in the form of a mixture of at least one aliphatic polyisocyanate and of at least one aromatic polyisocyanate, both comprising at least two or three isocyanate functional groups, such as a mixture of a biuret of hexamethylene diisocyanate with a trimethylol propane-adduct of xylylene diisocyanate, a mixture of a biuret of hexamethylene diisocyanate with a polyisocyanurate of toluene diisocyanate and a mixture of a biuret of hexamethylene diisocyanate with a trimethylol propane-adduct of toluene diisocyanate. Most preferably, it is a mixture of a biuret of hexamethylene diisocyanate with a trimethylol propane-adduct of xylylene diisocyanate.

In a preferred embodiment, the at least one aliphatic polyisocyanate and the at least one aromatic polyisocyanate are used in a respective molar ratio comprised between 80:20 and 10:90, preferably between 75:25 and 20:80, more preferably between 60:40 and 20:80, even more preferably between 60:40 and 30:70, most preferably between 45:55 and 30:70.

According to any of the above-embodiments, the at least one polyisocyanate is preferably added in an amount such that the w/w ratio of polyisocyanate to perfume oil in the dispersion is comprised between 0.001 and 0.1 preferably between 0.003 and 0.06, most preferably between 0.005 and 0.04.

In step 2), the formation of the water phase requires an aminoplast resin used in an amount such that the ratio of pure resin used to create the capsule wall to the quantity of encapsulated perfume oil core is very low. Such aminoplast resins are the reaction products of the polycondensation of one or more amine with one or more aldehyde, preferably formaldehyde. Examples of suitable amines include urea, melamine and its derivatives. Preferably, the aminoplast resin is selected from melamine-formaldehyde and urea-formaldehyde condensates and most preferably from melamine-formaldehyde condensates. Such melamine-formaldehyde and urea-formaldehyde condensates are well-known to the person skilled in the art of encapsulation and are described in details in the abundant available literature disclosing such condensates. Diverse materials and process steps are suitable for the formation of such condensates. Suitable methods for forming aminoplast resins are for example described in details in Dietrich K., Bonatz E., Nastke H., Herma H., Walter M. and Teige W.; Acta Polymerica 41 (1990), pp. 91-95, in Bonatz E., Dietrich K., Herma, H., Walter M. and Teige W.; Acta polymerica 40 (1989), pp. 683-690, in Dietrich K., Bonatz E., Geistlinger H., Herma H., Nastke R., Purz H.-J., Schlawne M. and Teige W.; Acta Polymerica 40 (1989), pp. 325-331, in Dietrich K., Herma H., Nastke R., Bonatz E. and Teige W.; Acta Polymerica 40 (1989), pp. 243-251, in Lee H. Y., Lee S. J., Cheong I. W. and Kim J. H.; J. Microencapsulation 19 (2002), pp. 559-569. Such encapsulating polymers therefore do not warrant a detailed description here, which would in any case not be exhaustive.

The pure aminoplast resin is added in an amount such that the w/w ratio between the aminoplast resin and the perfume oil in the dispersion is comprised between 0.001 and 0.09, preferably between 0.003 and 0.06, more preferably between 0.005 and 0.04, most preferably between 0.005 and 0.009.

The water phase optionally comprises a stabilizer. Typically, the dispersion comprises between about 0% and 5% w/w of at least one stabilizer, percentage being expressed on a w/w basis relative to the total weight of the dispersion as obtained after step 3). In still another aspect of the invention, the dispersion comprises between about 0% and 2% w/w of at least one stabilizer. In still another aspect of the invention, the dispersion comprises between about 0% and 1% w/w of at least one stabilizer.

For the sake of clarity, in the present context, by the expression "stabilizer", or the similar, it is meant the normal meaning understood by a person skilled in the art, i.e. a compound that is capable, or is added to stabilize the system, e.g. to prevent aggregation or agglomeration of the microcapsules, for example in the application or during their preparation. The use of said stabilizer is standard knowledge of the person skilled in the art.

For the purpose of the present invention, said stabilizer can be an ionic or non-ionic surfactant or a colloidal stabilizer. The exact nature of such stabilizers is well known from a person skilled in the art. As non-limiting examples, one may cite the followings stabilizers: non-ionic polymers such as cellulose derivatives such hydroxyethyl cellulose, polyethylene oxide, co-polymers of polyethylene oxide and polyethylene or polypropylene oxide, co-polymers alkyl acrylates and N-vinylpyrrolidone; ionic polymers such as co-polymers of acrylamide and acrylic acid (such as Alcapsol® 144 from Ciba), e.g. acid/acrylamide copolymers produced from monomer mixture of acrylic acid and acrylamide wherein the acrylic acid content is in the range of from 30 to 70%, acid anionic surfactant (such as sodium dodecyl sulfate), acrylic co-polymers bearing a sulfonate group (such as sodium poly(styrene sulfonate), and co-polymers of vinyl ethers and maleic anhydride.

According to any one of the above embodiments of the present invention, said stabilizer is an ionic surfactant, such as a co-polymer of acrylamide and acrylic acid.

Step 3) is an admixing step, which is well known and a person skilled in the art knows how to perform it. However it is worth mentioning that according to a particular embodiment, in said step the pH of the water phase can be adjusted typically between about 4 and 7, preferably between 4.5 and 6.

In step 4) the microcapsules of the invention are formed. Means to perform such step are also well known and a person skilled in the art knows how to perform it. U.S. Pat. No. 4,353,809 discloses a method which can be applied in the present invention. By way of non-limiting example, one can perform the curing by warming up the dispersion to about 60° to 95° C., up to the completion of the wall formation or yet by warming the dispersion up to 130° C. upon pressure. Then step 4) is completed by cooling the obtained dispersion to room temperature. The resulting product obtained after step 4) is a liquid dispersion also called "slurry".

According to a particular embodiment of the invention, at the end of step 4) one may also add to the invention's slurry some cationic polymers. Said cationic polymers are well known to a person skilled in the art, e.g. are described in WO2008/098387 page 5, lines 10 to 30.

Preferred cationic polymers will have cationic charge densities of at least 0.5 meq/g, more preferably at least about 1.5 meq/g, but also preferably less than about 7 meq/g, more preferably less than about 6.2 meq/g. The cationic charge density of the cationic polymers may be determined by the Kjeldahl method as described in the US Pharmacopoeia under chemical tests for Nitrogen determination.

The preferred cationic polymers are chosen from those that contain units comprising primary, secondary, tertiary and/or quaternary amine groups that can either form part of the main polymer chain or can be borne by a side substituent directly connected thereto. The weight average (Mw) molecular weight of the cationic polymer is preferably between 10,000 and 2M Dalton, more preferably between 50,000 and 1.5M Dalton. As specific examples, one may cite Salcare® SC60 (cationic copolymer of acrylamidopropyltrimonium chloride and acrylamide, origin: BASF) or Luviquat®, such as the PQ 11N, FC 550 or Supreme (polyquaternium-11 to 68 or quaternized copolymers of vinylpyrrolidone origin: BASF), or also the Jaguar® (C13S or C17, origin Rhodia).

According to any one of the above embodiments of the invention, there is added an amount of cationic polymers comprised between about 0% and 5% w/w, or even between about 0.1% and 2% w/w, percentage being expressed on a w/w basis relative to the total weight of the slurry as obtained after step 4). It is clearly understood by a person skilled in the art that only part of said added cationic polymers will be incorporated into/deposited on the microcapsule shell.

According to a particular embodiment of the invention, at the end of step 4) one may optionally add to the slurry, just before or after the cooling to room temperature compounds which are known to be scavengers of residuals free aldehydes such as formaldehyde. Such compounds are well known in the art and can for example be urea or ethylene urea.

Said aqueous slurry obtained at the end of step 4) can be used directly as perfuming ingredient, in particular for applications which are aqueous based, e.g. a softener or a liquid soap. Therefore another object of the present invention is an aqueous slurry comprising the invention's microcapsules, for example a slurry as obtained directly from the process of preparation of the microcapsules. Said slurry may further comprise some formulation aids, such as stabilizer or viscosity control agents, or even biocides or bactericides.

Alternatively, in the optional step 5), the slurry obtained by the process described above can be submitted to a drying, like spray-drying, to provide the microcapsules as such, i.e. in a powdery form. It is understood that any standard method known by a person skilled in the art to perform such drying is also applicable. In particular the slurry may be spray-dried preferably in the presence of a polymeric carrier material such as polyvinyl acetate, polyvinyl alcohol, dextrines, natural or modified starch, vegetable gums, pectins, xanthanes, alginates, carragenans or cellulose derivatives to provide microcapsules in a powder form.

A one shell aminoplast core-shell microcapsule as above-described with a size comprised between 1 and 100 μm comprising
   a core comprising a perfume oil;
   a shell made of an aminoplast resin cross-linked with a polyisocyanate;
characterized in that the w/w ratio between the aminoplast resin and the perfume oil in the capsule is comprised between 0.001 and 0.09, preferably between 0.003 and 0.06, more preferably between 0.005 and 0.04, most preferably between 0.005 and 0.009 is a further object of the invention.

A further object of the invention consists of a process for the preparation of aminoplast microcapsule comprising the steps of:
1) admixing a perfume oil with at least one polyisocyanate having at least two isocyanate functional groups to form an oil phase;
2) dispersing or dissolving into water an aminoplast resin and optionally a stabilizer to form a water phase;
3) preparing an oil-in-water dispersion, wherein the mean droplet size is comprised between 1 and 100 μm, by admixing the oil phase and the water phase;
4) performing a curing step to form microcapsules in the form of a liquid dispersion; and
5) optionally drying the liquid dispersion to obtain dried core-shell microcapsules;
characterized in that the aminoplast resin is added in an amount such that the w/w ratio between the aminoplast resin and the perfume oil in the dispersion is comprised between 0.001 and 0.09.

Another object of the present invention is a perfuming composition comprising:
(i) Microcapsules as defined above;
(ii) At least one ingredient selected from the group consisting of a perfumery carrier, a perfuming co-ingredient and mixtures thereof; and
(iii) Optionally at least one perfumery adjuvant.

As perfumery carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples solvents such as dipropyleneglycol, diethyl phthalate, isopropyl myristate, benzyl benzoate, 2-(2-ethoxyethoxy)-1-ethanol or ethyl citrate, which are the most commonly used. For the compositions which comprise both a perfumery carrier and a perfumery base, other suitable perfumery carriers than those previously specified, can be also ethanol, water/ethanol mixtures, isoparaffins such as those known under the trademark Isopar® (origin: Exxon Chemical) or glycol ethers and glycol ether esters such as those known under the trademark Dowanol® (origin: Dow Chemical Company).

A perfuming co-ingredient is not a microcapsule as defined above. Moreover, by "perfuming co-ingredient" it is meant here a compound, which is used in a perfuming preparation or a composition to impart a hedonic effect. In other words such a co-ingredient, to be considered as being a perfuming one, must be recognized by a person skilled in the art as being able to impart or modify in a positive or pleasant way the odor of a composition, and not just as having an odor.

The nature and type of the perfuming co-ingredients present do not warrant a more detailed description here, which in any case would not be exhaustive, the skilled person being able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said co-ingredients may also be compounds known to release in a controlled manner various types of perfuming compounds.

By "perfumery adjuvant" we mean here an ingredient capable of imparting additional added benefit such as a color, a particular light resistance, chemical stability, etc. A detailed description of the nature and type of adjuvant commonly used in perfuming bases cannot be exhaustive, but it has to be mentioned that said ingredients are well known to a person skilled in the art.

Preferably, the perfuming composition according to the invention comprises between 0.1 and 30% by weight of microcapsules as defined above.

The microcapsules of the invention present the advantage of having the right balance between stability in terms of perfume leakage when used in a challenging media such as a surfactant-based consumer product and odor performance i.e. intensity after capsule rubbing. The use of capsules as defined above as a perfume delivery system in a surfactant-rich consumer product is therefore another object of the invention. The reduced leakage leads to improved odor performance. Besides, and unexpectedly, when used in such a consumer product, the capsules have shown to release a limited amount of free formaldehyde.

The present invention relates also to a liquid perfumed consumer product comprising
a) from 2 to 65% by weight, relative to the total weight of the consumer product, of at least one surfactant;
b) water and/or a water-miscible hydrophilic organic solvents; and
c) the above aminoplast microcapsules.

Typical water-miscible, hydrophilic organic solvents include non-ionic polyoxyethylene-polyoxypropylene copolymer (such as described in U.S. Pat. No. 3,169,930 or GB1455283 to Witoc Chemical Corp), a low molecular weight polyethylene glycol (such as described in U.S. Pat.

No. 4,929,380 to Henkel), a glycol ether, an ethanolamine-based molecule, or a low molecular weight alcohol or amine.

A powder perfumed consumer product comprising
a) from 2 to 65% by weight, relative to the total weight of the consumer product, of at least one surfactant; and
b) at least one microcapsule as defined above is also part of the invention.

A perfumed consumer product according to the invention presents the advantage that the capsules used therein have a good stability, i.e. a reduced perfume leakage combined with good odor performance as illustrated in the examples below.

The microcapsules as obtained after step 5), or the slurry as obtained after step 4), can for example be incorporated in the consumer product in an amount of from 0.01 to 10% w/w, more preferably from 0.05 to 2% w/w, most preferably from 0.1 to 1% w/w, these percentages being defined by weight relative to the total weight of the consumer product. Of course the above concentrations may be adapted according to the olfactive effect desired in each product.

The consumer product may be in the form of a home- or personal-care product (liquid or powder) or in the form of an aqueous fine fragrance product. Examples of personal-care products include a shampoo, a leave-on or rinse-off hair conditioner, a body wash such as shower or bath, gel oil or mousse, an hygiene product, a body or hair spray, a cosmetic preparation, a body lotion, a deodorant or an antiperspirant, such as a roll-on deodorant or antiperspirant. Examples of aqueous fine fragrance products include a perfume, an after-shave lotion or Cologne. Examples of home-care products include a liquid detergent, an all-purpose cleaner, a fabric softener or refresher, an ironing water, a powder detergent, drier sheet or monodose liquid pods of detergent or fabric-softener. As detergents we include here products such as detergent compositions or cleaning products for washing up or for cleaning various surfaces, for example intended for the treatment of textiles or hard surfaces (floors, tiles, stone-floors, etc). Preferably the surface is a textile.

Formulations of consumer product bases can be found in the abundant literature relative to such products. These formulations do not warrant a detailed description here, which would in any case not be exhaustive. The person skilled in the art of formulating such consumer products is perfectly able to select the suitable components on the basis of his general knowledge and of the available literature. In particular, examples of such formulations can be found in the patents and patent applications relative to such products, for example in WO 2008/016684 (pages 10 to 14), in US 2007/0202063 (paragraphs [0044] to [0099]), in WO 2007/062833 (pages 26 to 44), in WO 2007/062733 (pages 22 to 40), in WO 2005/054422 (pages 4 to 9), in EP 1741775, in GB 2432843, in GB 2432850, in GB 2432851 or in GB 2432852.

The desired stability is obtained in consumer products comprising diverse types of surfactants, including cationic, anionic, non-ionic, zwitterionic and semi-polar nonionic surfactants, in amounts ranging up to 65% by weight, more preferably between 2 and 50% by weight, relative to the total weight of the consumer product. For the purpose of the present invention, surfactants are preferably intended as those commonly used in consumer good products. Those are well known to the person skilled in the art and do not warrant a more detailed description. Non-exhaustive examples of such surfactants comprise sodium alkylbenzene sulfonate, sodium alkyl sulfate, sodium alkyl ether sulfate and fatty acid salts for anionic surfactants; ethoxylated alcohols, alkyl N-methyl glucamide and alkyl polyglucoside for non-ionic surfactants; quaternary ammonium salts such as chloride or methylsulfate of alkyltrimethylammonium, di-(tallow-oxy-ethyl)dimethylammonium, ditallowdimethyl ammonium for cationic surfactants; alkyl betaines, alkylamido betaines, amine oxides for amphoteric and zwitterionic surfactants. For the purpose of the present invention, surfactants are preferably intended as excluding polymeric stabilizing emulsifiers such as acrylic copolymers and gum Arabic, which are typically used to stabilize emulsions in encapsulation processes.

In a preferred embodiment of the invention, the capsules are stable in the liquid aqueous perfumed consumer product so that less than 60%, preferably less than 40% of the initial perfume load leaks out of the capsules when they are stored in such a product. The storage time and temperature at which such stability is preferably reached depends on the consumer product type. Preferably, such stability results are reached after 4 weeks storage at 37° or 43° C., for products such as liquid detergents and fabric softeners.

The invention will now be further described by way of examples. It will be appreciated that the invention as claimed is not intended to be limited in any way by these examples.

EXAMPLES

The following examples are illustrative of the present invention embodiments and should not be considered as limiting the invention, and further demonstrate the advantages of the invention capsules relative to prior art teachings.

Example 1

Preparation of Control Aminoplast Microcapsules According to WO 2013/092375A1

Control Aminoplast microcapsules (Capsules A & B) according to WO2013/092375A1 were prepared with the following ingredients:

TABLE 1

| Composition of Control Capsules A & B | | |
|---|---|---|
| Ingredient | Capsule A Ref Example 1 of WO 2013/092375 A1 Amount [%] | Capsule B Optimised capsule of example 1 with 2 melamine - formaldehyde resins Amount [%] |
| Oil Phase | 30.9 | 30.9 |
| Perfume oil[1] | 30.28 | 30.28 |
| Polyisocyanate[2] | 0.62 | 0.62 |
| Water phase | 69.1 | 69.1 |
| Acrylamide and acrylic acid copolymer[3] | 4.7 | 4.7 |
| Melamine-formaldehyde resin(s) | 4.7[4] | 4.7[5] |
| Water | 48.3 | 48.3 |
| Sodium hydroxyde | 0.5 | 0.5 |
| Acetic acid | 0.2 | 0.2 |
| Salcare ® SC60[6] | 10.7 | 10.7 |
| Total | 100 | 100 |
| Ratio of pure melamine/formaldehyde resin(s) to perfume oil[7] | 0.109 | 0.109 |

[1] see Table 2
[2] trimethylol propane-adduct of xylylene diisocyanate: Takenate ® D-110N; origin: Mitsui Chemicals
[3] Alcapsol ™ (origin: Ciba), 20% solution in water
[4] methylated high imino melamine resin in Cymel ® 385 (origin: Cytec), 70% solution in water
[5] 90/10 blend of Cymel ® 385 (see above) & Cymel 9370 (highly methylated melamine; origin: Cytec), both 70% solution in water
[6] acrylamidopropyltrimonium chloride/acrylamide copolymer; origin: CIBA, 3% solution in water
[7] = pure melamine/formaldehyde resin (70% of quantity used in [2] or [3])/quantity of perfume oil

TABLE 2

Perfume oil

| Ingredients | Wt % |
| --- | --- |
| Ethyl 2-methylbutyrate | 5.2% |
| Amyl acetate | 2.5% |
| Octanal | 3.1% |
| Hexyl Acetate | 9.7% |
| Methylparacresol | 1.0% |
| Limonene | 3.7% |
| Amyl Butyrate | 1.0% |
| Nonanal | 2.85% |
| 2,4-Dimethyl-3-cyclohexene-1-carbaldehyde | 2.75% |
| Eucalyptol | 8.5% |
| Menthone | 0.4% |
| Allyl Heptanoate | 8.0% |
| Decanal | 9.0% |
| 2-Methylundecanal | 3.2% |
| Delta Damascone | 5.9% |
| Yara Yara | 5.4% |
| Neobutenone | 1.0% |
| 1-(2,6,6-trimethyl-1-cyclohex-2-enyl)pent-1-en-3-one | 5.0% |
| Lilial ®[1)] | 8.5% |
| Undecalactone gamma | 8.5% |
| Norlimbanol | 0.9% |
| Benzyl Benzoate | 3.9% |
| Total | 100.0% |

[1)]3-(4-tert-butylphenyl)-2-methylpropanal; origin: Givaudan

The oil phase was prepared by admixing a polyisocyanate (trimethylol propane adduct of xylylene diisocyanate, Takenate® D-110N, origin: Mitsui Chemicals) with a perfume oil comprising the ingredients listed in Table 2. The oil phase consisted of 2% Takenate® D-110N and 98% of the perfume oil. Preferably, at least one polyisocyanate like Takenate D-110N was added in an amount comprised between 0.1% and 10%, preferably between 0.5% and 5%. After encapsulation and use of the Takenate D-110N to cross-link the melamine-formaldehyde wall, the residual level of unreacted polyisocyanate in the perfume oil was very low and therefore the internal core of the capsule was only made of the perfume oil. Reference capsule A is a repetition of example 1 of WO2013/092375 A1 while reference capsule B is an optimization of capsule A, using a mixture of 2 melamine-formaldehyde resins instead of one in Capsule A, the new second, more hydrophobic melamine-formaldehyde resin Cymel 9370 having been shown to provide a little more stability of the capsule upon storage in surfactant-rich products.

To make the capsules slurry, the acrylamide and acrylic acid copolymer and the melamine-formaldehyde resin were dissolved in water to form the water phase. Then the perfume premix oil was added into this solution and the pH was regulated to 5 with acetic acid. The temperature was raised to 90° C. for 2 hours to allow the curing of the capsules. At this point, capsules were formed, cross-linked and stable. A 3% Salcare® SC60 (trademark from Ciba) solution in water was then added into the mixture at 90° C. and was allowed to react for 1 hour at 90° C. Then a solution of ethylene urea (50% wt in water) was added as usually done with aminoplast capsules as an agent to scavenge residual free formaldehyde. Final slurry contains about 3% w/w of ethylene urea relative to the weight of the slurry and the mixture was left to cool down to room temperature. The final pH was adjusted to 7 with sodium hydroxide.

Example 2

Preparation of Aminoplast Microcapsules According to the Invention

Capsules C to L were prepared according to the protocol described in example 1, with a significantly lower ratio of pure melamine-formaldehyde resin used to make the capsule wall, to the amount of perfume oil compared to the control examples (example 1) based on WO2013/092375 A1.

TABLE 3

Composition of Capsules C to L of the invention

| Ingredient | C [%] | D [%] | E [%] | F [%] | G [%] | H [%] | I [%] | J [%] | K [%] | L [%] |
| --- | --- | --- | --- | --- | --- | --- | --- | --- | --- | --- |
| Oil Phase | 30.9 | 30.9 | 30.9 | 30.9 | 30.9 | 30.9 | 30.9 | 30.9 | 30.9 | 30.9 |
| Perfume oil | 30.28 | 30.28 | 30.28 | 30.28 | 30.28 | 30.28 | 30.28 | 30.28 | 30.28 | 30.28 |
| Takenate ® D110N[1)] | 0.62 | 0.62 | 0.62 | 0.62 | 0.62 | 0.62 | 0.62 | 0.62 | 0.62 | 0.62 |
| Water phase | 69.1 | 69.1 | 69.1 | 69.1 | 69.1 | 69.1 | 69.1 | 69.1 | 69.1 | 69.1 |
| Acrylamide and acrylic acid copolymer[2)] | 4.7 | 4.7 | 4.7 | 4.7 | 4.7 | 4.7 | 4.7 | 4.7 | 3.5 | 3.5 |
| Melamine-formaldehyde resins[3)] | 2.45[3)] | 1.85[3)] | 1.25[3)] | 1.0[3)] | 0.6[3)] | 0.25[3)] | 0.12[3)] | 0.03[3)] | 1.85[3)] | 1.25[3)] |
| Water | 50.55 | 51.15 | 51.75 | 52 | 52.4 | 52.75 | 52.88 | 52.88 | 55.05 | 55.65 |
| Sodium hydroxyde | 0.5 | 0.5 | 0.5 | 0.5 | 0.5 | 0.5 | 0.5 | 0.5 | 0.5 | 0.5 |
| Acetic acid | 0.2 | 0.2 | 0.2 | 0.2 | 0.2 | 0.2 | 0.2 | 0.2 | 0.2 | 0.2 |
| Salcare SC60[4)] | 10.7 | 10.7 | 10.7 | 10.7 | 10.7 | 10.7 | 10.7 | 10.7 | 8.0 | 8.0 |
| Total | 100 | 100 | 100 | 100 | 100 | 100 | 100 | 100 | 100 | 100 |
| Ratio of pure melamine/formaldehyde resins to perfume oil [5)] | 0.057 | 0.043 | 0.029 | 0.023 | 0.014 | 0.006 | 0.003 | 0.001 | 0.043 | 0.029 |

[1)]trimethylol propane-adduct of xylylene diisocyanate; origin: Mitsui Chemicals
[2)]Alcapsol ™ (origin: Ciba), 20% solution in water
[3)]90/10 blend of Cymel ® 385 & Cymel ® 9370 (origin: Cytec), both 70% solution in water
[4)]Salcare ® SC60 (origin: Ciba), 3% solution in water
[5)] = pure melamine/formaldehyde resin (70% of quantity used in[2)])/quantity of perfume oil

Example 3

Average Diameter of the Capsules of the Invention

The size distribution of Control Capsules A and B and of Capsules C to L was controlled by Optical Microscopy and Light Scattering (Mastersizer S, Malvern) and the average diameter was calculated (arithmetic mean) for each type of capsules. The results are summarized in Table 4.

TABLE 4

Average diameter of Capsules A to L

| Capsules | Average diameter d(v, 0.5) [μm] |
|---|---|
| Control Capsules A | 16 |
| Control Capsules B | 15 |
| Capsules C | 17 |
| Capsules D | 22 |
| Capsules E | 20 |
| Capsules F | 20 |
| Capsules G | 21 |
| Capsules H | 20 |
| Capsules I | 15 |
| Capsules J | 15 |
| Capsules K | 20 |
| Capsules L | 20 |

Example 4

Fabric Softener According to the Invention

A concentrated un-perfumed fabric softener base was prepared by admixing the ingredients listed in Table 5, in the amounts indicated. The percentages are defined by weight relative to the total weight of the un-perfumed fabric softener base.

TABLE 5

Formulation of the concentrated un-perfumed fabric softener base (pH ~2.85)

| Ingredient | % |
|---|---|
| Stepantex VL90 [1] | 11.0 |
| Proxel™ GXL [2] | 0.04 |
| CaCl$_2$ (10% aqueous solution) | 0.20 |
| Water | 88.76 |

[1] Ammonium methyl bis[ethyl (sulf)]-2-hydroxyethyl methosulfate; Origin: Stepan
[2] 20% aqueous dipropylene glycol solution of 1,2-benzisothiazolin-3-one Origin: Avecia Softeners C to L were prepared by adding Capsules C to L at 0.45% by weight, relative to the total weight of the softener into the un-perfumed softener base of Table 5 under gentle shaking.

Preparation of a Fabric-softener Comprising Control Capsules A and B:

Control Softeners A and B were prepared by adding Control Capsules A and B at 0.45% by weight, relative to the total weight of the softener into the un-perfumed softener base of Table 5 under gentle shaking.

Stability of the Aminoplast Microcapsules in Fabric Softeners

The storage stability of the capsules in Control Softener A & B and in Softeners C to L was evaluated. The softeners were stored for up to one month at 37° C. or 43° C. or. The amount of perfume having leaked out of the capsules was then measured by solvent extraction and GC-MS analysis. The results are summarized in Table 6.

TABLE 6

Storage stability of the capsules in Softeners C to L and in Control Softener A & B

| Fabric softener | Ratio of pure melamine/ formaldehyde resins to perfume oil | % of perfume having leaked out of capsule upon storage | | | |
|---|---|---|---|---|---|
| | | After 2 weeks at 37° C. | After 2 weeks at 43° C. | After 4 weeks at 37° C. | After 4 weeks at 43° C. |
| Control Softener A | 0.109 | 14 | 27 | 27 | 50 |
| Control Softener B | 0.109 | 11 | 22 | 23 | 43 |
| Softener C | 0.057 | 4 | 11 | 7 | 20 |
| Softener D | 0.043 | 2 | 7 | 5 | 11 |
| Softener E | 0.029 | 1 | 4 | 3 | 6 |
| Softener F | 0.023 | 0.5 | 2 | 2 | 5 |
| Softener G | 0.014 | 0.25 | 1 | 1 | 5 |
| Softener H | 0.006 | 2 | 10 | 4 | 18 |
| Softener I | 0.003 | 13 | 22 | 12 | 30 |
| Softener J | 0.001 | 19 | 29 | 20 | 42 |
| Softener K | 0.043 | 3 | 9 | 5 | 11 |
| Softener L | 0.029 | 1 | 4 | 3 | 5 |

Figure 2:
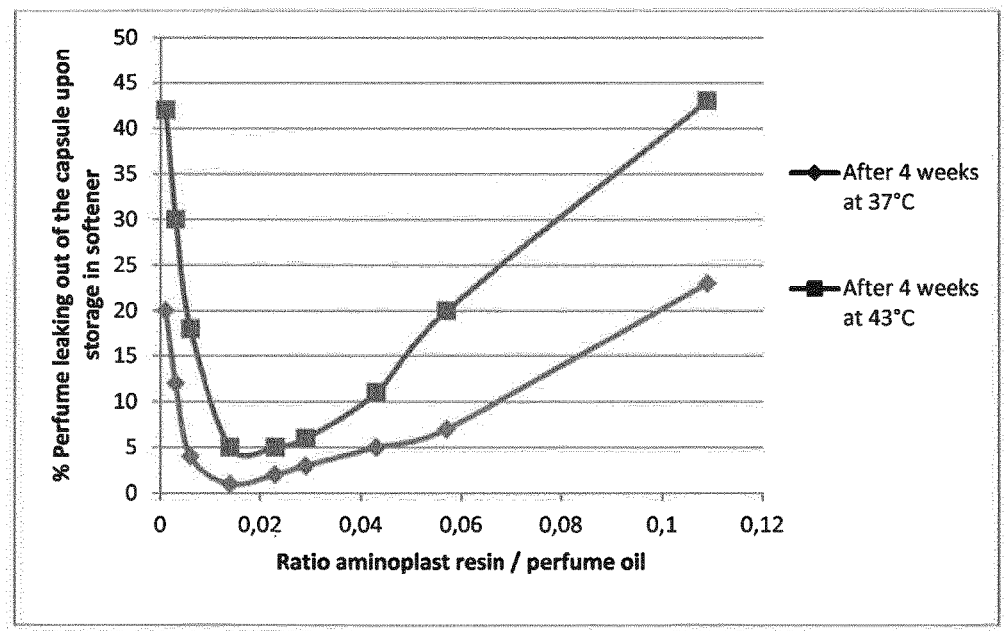
FIG. 2 represents the percentage of perfume leaking out of capsules into a softener base after 4 weeks storage of the softeners at either 37° C. or 43° C., as a function of the ratio of aminoplast resin to perfume oil.

It is apparent from these results illustrated in FIGS. 1 and 2 that each of Capsules C to J of the present invention was more stable in the softener base than the corresponding Control Capsules A and B according to WO2013/092375, since less perfume leaked out of the capsules after the storage period. This shows that, at a constant perfume loading, thanks to the addition of the hydrophobic polyisocyanate in the perfume oil in order to cross-link the melamine-formaldehyde wall, much lower level of melamine-formaldehyde resin is needed to make the capsule wall compare to what has been previously described in the art. Not only does this reduction in quantity of melamine-formaldehyde resin has no negative impact on storage stability of the capsule in softener, but it also unexpectedly leads to much improved storage stability versus the control capsules, suggesting an unexpected better/more efficient cross-linking of the capsule wall at lower amount of melamine-formaldehyde resin than when more melamine-formaldehyde resin was used. Best results were achieved when the ratio of pure melamine-formaldehyde resin to the amount of perfume oil was reduced to between 0.002 and 0.06, preferably between 0.005 and 0.05 versus 0.109 in the reference capsules A and B.

Stability of capsules K & L also shows that even if the amount of acrylamide and acrylic acid copolymer used as emulsifier and the amount of cationic polymer used are also reduced at the same time as the reduction in aminoplast, this has very little negative effect on the capsule stability. Both capsules K & L are significantly more stable than the Control capsules A & B and in fact show very similar stability to the corresponding capsules D & E where only the amount of aminoplast used was reduced. This latter reduction therefore is the critical factor in the observed stabilization.

Olfactive Performance of the Aminoplast Microcapsules in the Fabric Softener of the Invention The olfactive performance of Control Capsules A and B and of Capsules C to L was evaluated in Control Softener A and B and in Softeners C to L, both fresh and after storage for up to 4 weeks at 37° or 43° C.

Cotton terry towels (20 pieces, 18 cm*18 cm, about 30 g each) were washed with 30 g of un-perfumed detergent (standard powder) in a washing machine (Miele Novotronic W300-33CH) at 40° C. using the short cycle program. The wash was followed by a rinse at 900 rpm with 12.7 g of the Softeners C to L or Control Softener A and B. The terry towels were then line dried for 24 hours before being evaluated.

The intensity of the perception of the perfume on the dry towels treated with Softeners C to L and Control Softeners A and B was evaluated by a panel of 20 trained panellists. They were asked to evaluate the towels with very gentle handling (picking them up and bringing them to their nose for smelling) first then in a second stage, after rubbing the towels in their hands. At both stages, they were asked to rate the intensity of the perfume perception on a scale ranging from 1 to 10, wherein 1 means no odour and 10 means very strong odour. The results are summarized in the following table.

melamine-formaldehyde wall, much lower level of melamine-formaldehyde resin is needed to make the capsule wall compare to what has been previously described in the art. Not only does this reduction in quantity of melamine-formaldehyde resins has no negative impact on storage stability of the capsule in softener, it unexpectedly leads to much improved storage stability versus the control capsules, suggesting an unexpected better/more efficient cross-linking of the capsule wall at lower amount of melamine-formaldehyde resin than when more melamine-formaldehyde resin was used. Best results are achieved when the ratio of pure melamine-formaldehyde resin to the amount of capsule core (perfume oil) is reduced to between 0.002 and 0.06, preferably between 0.005 and 0.05 versus 0.109 in the Control capsules A and B.

TABLE 7

Olfactive performance of Capsules C to L versus Control softeners A & B both fresh and after storage for 4 weeks at 37° C. or 43° C.

| Fabric softener | Ratio of pure melamine/ formaldehyde resins to perfume oil | Olfactive performance (perfume intensity value) | | | | | |
|---|---|---|---|---|---|---|---|
| | | Fresh | | 4 weeks at 37° C. | | 4 weeks at 43° C. | |
| | | With very gentle handling | After rubbing | With very gentle handling | After rubbing | With very gentle handling | After rubbing |
| Control Softener A | 0.109 | 2.0 | 6.3 | 2.1 | 6.0 | 2.3 | 4.5 |
| Control Softener B | 0.109 | 2.1 | 6.4 | 2.2 | 6.1 | 2.5 | 4.7 |
| Softener C | 0.057 | 3.1 | 6.95 | 3.1 | 6.85 | 3.6 | 6.2 |
| Softener D | 0.043 | 3.9 | 8.1 | 3.8 | 7.6 | 3.8 | 6.5 |
| Softener E | 0.029 | 4.1 | 8.2 | 3.65 | 7.8 | 3.9 | 6.6 |
| Softener F | 0.023 | 3.8 | 7.81 | Not done | Not done | 4.3 | 6.7 |
| Softener G | 0.014 | 3.7 | 6.9 | 3.65 | 6.9 | 4.2 | 6.5 |
| Softener H | 0.006 | 3.65 | 6.5 | 3.55 | 6.5 | 3.3 | 6.4 |
| Softener I | 0.003 | 2.9 | 5.8 | Not done | Not done | 2.8 | 4.6 |
| Softener J | 0.001 | 2.7 | 5.5 | Not done | Not done | 2.6 | 4.0 |
| Softener K | 0.043 | 4.5 | 7.4 | Not done | Not done | 4.0 | 6..4 |
| Softener L | 0.029 | 3.7 | 6.7 | Not done | Not done | 3.8 | 6.3 |

Figure 3:
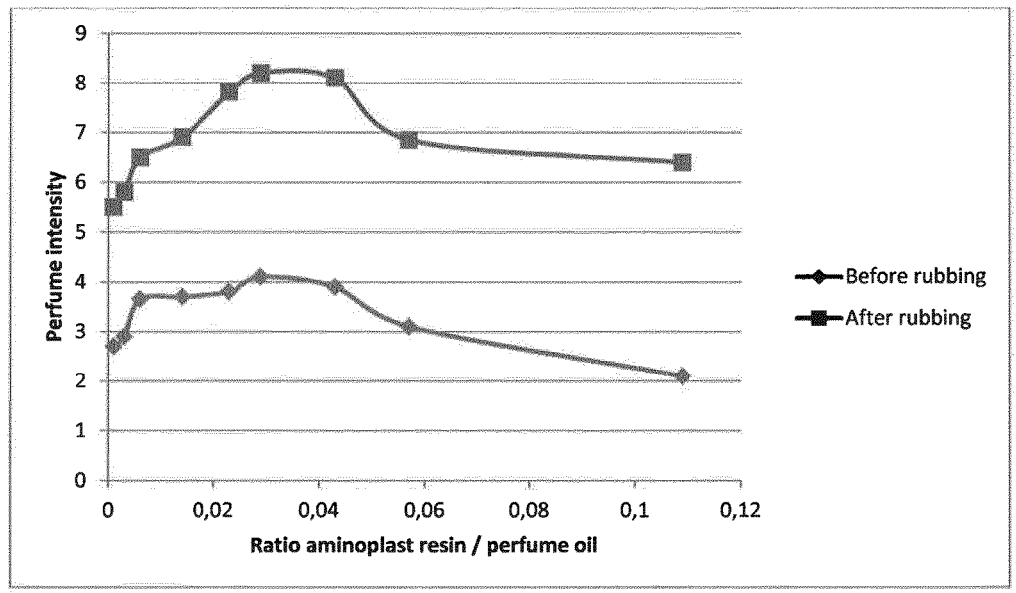
FIG. 3 represents the perfume intensity from capsules before and after rubbing as a function of the ratio of aminoplast resin to perfume oil, for freshly made softeners.
Figure 4:
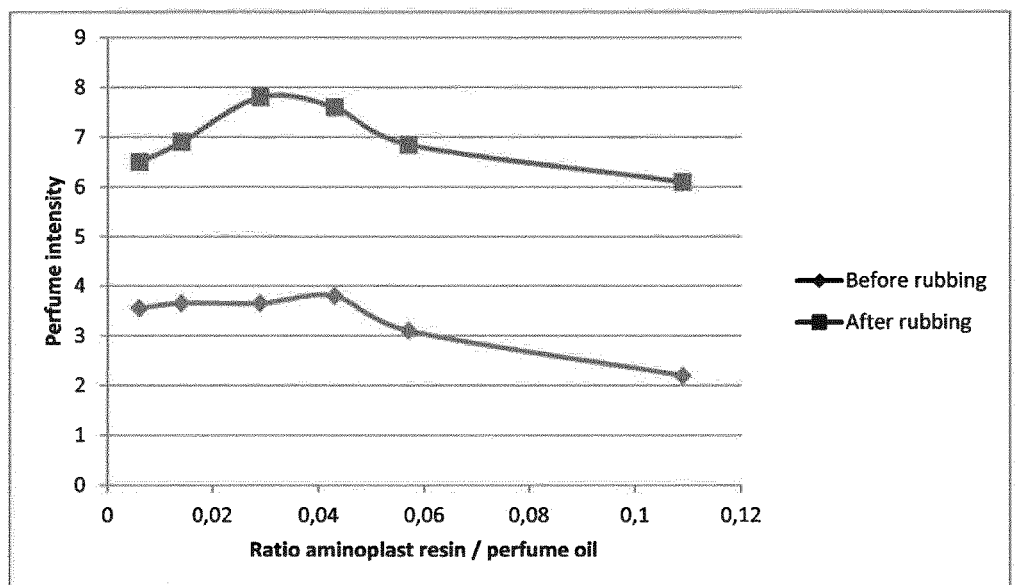
FIG. 4 represents the perfume intensity from capsules before and after rubbing as a function of the ratio of aminoplast resin to perfume oil, after storage in a softener for 4 weeks at 37° C.
Figure 5:
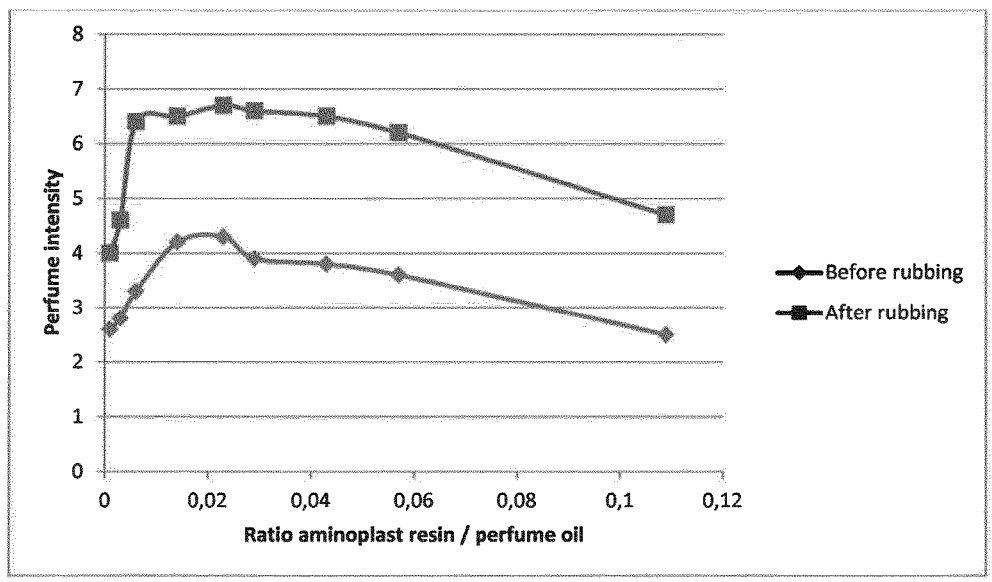
FIG. 5 represents the perfume intensity from capsules before and after rubbing as a function of the ratio of aminoplast resin to perfume oil, after storage in a softener for 4 weeks at 43° C.

These results illustrated in FIGS. 3-5 make it clear that, on fresh towels, use of less aminoplast resin to make the capsule wall leads to significantly higher olfactive performance of the capsules on fabrics versus reference capsules A and B, both before and after rubbing if the ratio of pure aminoplast resins to perfume oil is greater than 0.006 (capsules C to H). When a very small amount of aminoplast resin is used (ratio of pure aminoplast resins to perfume oil between 0.001 and 0.006, capsules I & J), the capsules are more performing before rubbing than the two reference capsules A and B but less after rubbing. Results show that a combination of both aminoplast resin (even in very low concentration) and polyisocyanate is needed to achieve a satisfactory olfactive impact.

Compared to the control softeners A & B, results after storage are in line with those experienced on fresh. Capsules of the invention outperform the reference capsules A and B, both before and after rubbing if the ratio of pure aminoplast resins to perfume oil core is greater than 0.006 (capsules C to H). When a very small amount of aminoplast resin is used (ratio of pure aminoplast resins to perfume oil core between 0.001 and 0.006, capsules I & J), the capsules are more performing before rubbing than the two reference capsules A and B but less after rubbing. This shows that, at a constant perfume loading, thanks to the addition of the hydrophobic polyisocyanate in the perfume oil in order to cross-link the Capsules K & L with reduced aminoplast resin and reduced polyacrylate emulsifier and reduced cationic polymer are also better than the Control capsules A & B and performing in a very similar way to the corresponding capsules D & E where only the aminoplast capsules was reduced versus Control capsules A & B, clearly highlighting the importance of the reduction in aminoplast resin as the key drivers to this unexpected improvement. The same pattern is observed after 4 weeks storage at 43° C.

Example 8

Detectable Free Formaldehyde in the Fabric Softener of the Invention after Addition of the Aminoplast Microcapsules The concentration of free formaldehyde detectable in the fabric-softener product was evaluated after addition of 1% of the capsules in Control Softener B and in Softeners C to E. The softeners were stored for up to two months at 37° C. or 43° C. The amount of detectable free formaldehyde being released from the capsules into the fabric-softener matrix was then measured by derivitization and HPLC-MS analysis (method which has a detection threshold of about 1 ppm free formaldehyde). The results are summarized in Table 8.

TABLE 8

Detectable free formaldehyde in the fabric softener of the invention after addition of aminoplast microcapsules & storage for 2 months at 37° C. or 43° C.

| Fabric softener | Ratio of pure melamine/ formaldehyde resins to perfume oil core | Free formaldehyde detectable in the fabric-softener matrix after storage | |
|---|---|---|---|
| | | 8 weeks 37° C. | 8 weeks 43° C. |
| Control Softener A | 0.109 | 20 ppm | 21 ppm |
| Control Softener B | 0.109 | 19 ppm | 20 ppm |
| Softener C | 0.057 | 10 ppm | 12 ppm |
| Softener D | 0.043 | Not detectable (<1 ppm) | 7 ppm |
| Softener E | 0.029 | Not detectable (<1 ppm) | Not detectable (<1 ppm) |
| Softener G | 0.014 | Not detectable (<1 ppm) | Not detectable (<1 ppm) |

As expected, a reduction in the amount of melamine-formaldehyde resin used to make the capsule wall also leads to a reduction in the amount of detectable free formaldehyde being released upon storage into the fabric-softener matrix. However, unexpectedly, the reduction in detectable free formaldehyde in fabric-softener is much more pronounced that the reduction melamine-formaldehyde resin used to make the capsule wall.

Example 9

Preparation of a Concentrated Liquid Detergent Containing Capsules

Detergents C, D, E and G were prepared by adding capsules C, D, E and G at 0.6% by weight, relative to the total weight of the detergent, into the commercially available concentrated liquid detergent base Persil® 3× Small and Mighty (trademark of Unilever, UK). This base (pH~8) contains 5% to 15% of nonionic surfactants (such as alcohol ethoxylates) and anionic surfactants (such as sodium alkylbenzene sulphonate and sodium alkyl ether sulphate), with also less than 5% fatty soap.

Preparation of a Concentrated Liquid Detergent Comprising Control Capsules B

Control Detergent B was prepared by adding Control Capsules B at 0.60% by weight, relative to the total weight of the detergent into the commercially available concentrated liquid detergent Persil® Small and Mighty (trademark of Unilever, UK).

Olfactive Performance of Aminoplast Microcapsules in a Concentrated Liquid Detergent of the Invention The olfactive performance of Capsules C, D, E and G and of Control Capsules B was then evaluated in Detergents C, D, E and G and in Control Detergent B.

Fabrics (2 kg of cotton terry towels) were washed at 40° C. in a standard European horizontal axis machine. There were dispensed 35 g of freshly prepared detergent at the start of the wash through the little dosing cup placed in the drum with the fabrics. After the wash, fabrics were line-dried and the odor intensity of the cotton towels was evaluated by a panel of 20 trained panelists, after 1 day drying. The panelists were asked to rate the odor intensity of the towels first before rubbing then after gentle rubbing of the fabrics by hand on a scale from 1 to 7, 1 corresponding to odorless and 7 corresponding to a very strong odor. The results are shown in Table 9.

TABLE 9

Olfactive performance of Capsules C, D, E and G and of Control Capsules B in concentrated liquid detergent

| Detergent | Before rubbing | After rubbing |
|---|---|---|
| Control Detergent B | 2.8 | 4.7 |
| Detergent C | 4.2 | 6.0 |
| Detergent D | 3.9 | 5.4 |
| Detergent E | 3.3 | 5.1 |
| Detergent G | 2.9 | 4.9 |

It is clear that, on fresh towels, use of less aminoplast resin to make the capsule wall leads to significantly higher olfactive performance of the capsules on fabrics versus Control capsules B, both before and after rubbing if the ratio of pure aminoplast resins to perfume oil is greater than 0.014 (capsules C, D, E and G).

Stability of the Aminoplast Microcapsules in the Concentrated Liquid Detergent of the Invention The storage stability of the capsules in Detergents C, D, E and G and in Control Detergent B was evaluated. The detergents comprising the capsules were stored during up to four weeks at 37° C. and the amount of perfume having leaked out of the capsules was measured by solvent extraction and GC-MS analysis. The results are summarized in the following table.

TABLE 10

Perfume leakage out of the capsules in Detergents C, D, E and G and in Control Detergent B

| Detergent | After 2 weeks at 37° C. | After 4 weeks at 37° C. |
|---|---|---|
| Control Detergent B | 36% | 54% |
| Detergent C | 21% | 33% |
| Detergent D | 19% | 29% |
| Detergent E | 18% | 27% |
| Detergent G | 19% | 30% |

It is apparent from these results that each of Capsules C, D, E and G of the present invention was more stable in the concentrated liquid detergent base than the corresponding Control Capsules B according to WO2013/092375, since less perfume leaked out of the capsules after the storage period. This shows that, at a constant perfume loading, thanks to the addition of the hydrophobic polyisocyanate in the perfume oil in order to cross-link the melamine-formaldehyde wall, much lower level of melamine-formaldehyde resin is needed to make the capsule wall compare to what has been previously described in the art. Not only does this reduction in quantity of melamine-formaldehyde resins has no negative impact on storage stability of the capsule in concentrated liquid detergent, it unexpectedly leads to much improved storage stability versus the control capsules B, suggesting an unexpected better/more efficient cross-linking of the capsule wall at lower amount of melamine-formaldehyde resin than when more melamine-formaldehyde resin was used. Best results are achieved when the ratio of pure melamine-formaldehyde resin to the amount of perfume oil is reduced to between 0.01 and 0.06 versus 0.109 in the Control capsules B.

What is claimed is:

1. A one shell aminoplast core-shell microcapsule that can withstand contact with surfactants and is obtained by or has the same composition and properties as a microcapsule obtained by a process comprising the steps of:

1) admixing a perfume oil with at least one polyisocyanate having at least two isocyanate functional groups to form an oil phase;
2) dispersing or dissolving into water an aminoplast resin and optionally a stabilizer to form a water phase;
3) adding the oil phase to the water phase to form an oil-in-water dispersion, wherein the mean droplet size is comprised between 1 and 100 μm;
4) performing a curing step to form at least one microcapsule in the form of a liquid dispersion, with the microcapsules having a wall made by the reaction between the polyisocyanate and the aminoplast resin; and
5) optionally drying the liquid dispersion to obtain at least one dried core-shell microcapsule;
wherein the aminoplast resin is added in an amount such that the w/w ratio between the aminoplast resin and the perfume oil in the dispersion is comprised between 0.001 and 0.09.

2. A microcapsule according to claim 1, wherein the perfume oil contains less than 20 wt % solvent.

3. A microcapsule according to claim 1, wherein the aminoplast resin is added in an amount such that the w/w ratio between the aminoplast resin and the perfume oil in the dispersion is comprised between 0.003 and 0.06.

4. A microcapsule according to claim 1, wherein the aminoplast resin is added in an amount such that the w/w ratio between the aminoplast resin and the perfume oil in the dispersion is comprised between 0.005 and 0.04.

5. A microcapsule according to claim 1, wherein said the aminoplast resin is added in an amount such that the w/w ratio between the aminoplast resin and the perfume oil in the dispersion is comprised between 0.005 and 0.009.

6. A microcapsule according to claim 1, wherein the at least one polyisocyanate is a mixture of at least one aliphatic polyisocyanate and at least one aromatic polyisocyanate, the at least one aliphatic polyisocyanate and the at least one aromatic polyisocyanate being present in a respective molar ratio ranging from 80:20 to 10:90.

7. A microcapsule according to claim 1, wherein the at least one polyisocyanate is an aromatic polyisocyanate.

8. A microcapsule according to claim 1, wherein the at least one polyisocyanate is added in an amount such that the w/w ratio of polyisocyanate to perfume oil in the dispersion is comprised between 0.001 and 0.1, between 0.003 and 0.06, or between 0.005 and 0.04.

9. A microcapsule according to claim 1, wherein the aminoplast resin is a melamine-formaldehyde or urea-formaldehyde condensate.

10. A perfuming composition comprising
(i) microcapsules as defined in claim 1;
(ii) At least one ingredient selected from the group consisting of a perfumery carrier, a perfuming co-ingredient and mixtures thereof; and
(iii) optionally at least one perfumery adjuvant.

11. A liquid perfumed consumer product comprising:
a) from 2 to 65% by weight, relative to the total weight of the consumer product, of at least one surfactant;
b) water or a water-miscible hydrophilic organic solvent; and
c) microcapsules as defined in claim 1.

12. A liquid perfumed consumer product according to claim 11, wherein said product is a home- or personal-care product.

13. A powder perfumed consumer product comprising
a) from 2 to 65% by weight, relative to the total weight of the consumer product, of at least one surfactant; and
b) microcapsules as defined in claim 1.

14. A surfactant-rich consumer product containing therein microcapsules as defined in claim 1 as a perfume delivery system, wherein the surfactant-rich consumer product comprises from 2 to 65% by weight, relative to the total weight of the consumer product, of at least one surfactant.

15. A one shell aminoplast core-shell microcapsule as defined in claim 1 with a size comprised between 1 and 100 μm comprising
a core comprising a perfume oil;
a shell made of an aminoplast resin cross-linked with a polyisocyanate;
wherein the w/w ratio between the aminoplast resin and the perfume oil in the capsule is comprised between 0.001 and 0.09, between 0.003 and 0.06, between 0.005 and 0.04, or between 0.005 and 0.009.

16. The microcapsule of claim 1 wherein the w/w ratio between the aminoplast resin and the perfume oil in the dispersion is 0.057 or less.

17. A process for the preparation of aminoplast microcapsules that can withstand contact with surfactants, comprising the steps of:
1) admixing a perfume oil with at least one polyisocyanate having at least two isocyanate functional groups to form an oil phase;
2) dispersing or dissolving into water an aminoplast resin and optionally a stabilizer to form a water phase;
3) preparing an oil-in-water dispersion, wherein the mean droplet size is comprised between 1 and 100 μm, by admixing the oil phase and the water phase;
4) performing a curing step to form microcapsules in the form of a liquid dispersion, with the microcapsules having a wall made by the reaction between the polyisocyanate and the aminoplast resin; and
5) optionally drying the liquid dispersion to obtain dried core-shell microcapsules;
wherein the aminoplast resin is added in an amount such that the w/w ratio between the aminoplast resin and the perfume oil in the dispersion is comprised between 0.001 and 0.09.

18. The process of claim 17, wherein the w/w ratio between the aminoplast resin and the perfume oil in the dispersion is 0.057 or less.

* * * * *